Nov. 25, 1969    G. P. COUTILISH    3,480,271
TOGGLE CLAMP
Filed Oct. 18, 1967    2 Sheets-Sheet 1

INVENTOR.
George P. Coutilish
BY
David A. Greenlee
ATTORNEY

Nov. 25, 1969    G. P. COUTILISH    3,480,271
TOGGLE CLAMP

Filed Oct. 18, 1967    2 Sheets-Sheet 2

INVENTOR.
George P. Coutilish
BY
David C. Greenlee
ATTORNEY

United States Patent Office 3,480,271
Patented Nov. 25, 1969

3,480,271
TOGGLE CLAMP
George P. Coutilish, Detroit, Mich., assignor to General Motors Corporation, Detroit, Mich., a corporation of Delaware
Filed Oct. 18, 1967, Ser. No. 676,233
Int. Cl. B25b 1/14
U.S. Cl. 269—228    7 Claims

ABSTRACT OF THE DISCLOSURE

A welding fixture is adapted to position sheet metal parts for spot welding together by a plurality of welding guns. A plurality of toggle clamps are mounted on the fixture for clamping the parts together prior to welding. Each clamp includes a pair of movable jaws which are pivotally interconnected and one of which is pivoted to a support. An operating member is pivoted to the support and is operatively connected to the jaws by toggle links which move overcenter to lock the clamp in closed position. Adjustable stops are provided to position the clamp in closed position and a spring is provided to bias the clamp into open and closed positions.

---

This invention relates generally to clamps and more particularly to a toggle clamp for clamping sheet metal parts together preparatory to welding.

Vehicles and many other structures include a plurality of sheet metal parts which are welded together. Prior to welding the parts are placed in a welding fixture and clamped adjacent the proposed weld to assure proper location of the parts. Many of these parts have complex shapes and it is frequently necessary to weld them together at relatively inaccessible locations.

Previously, clamps having a single movable jaw were used. However, such clamps require extra clamp positioning devices to permit movement of the fixed jaw away from the clamping area to enable insertion and removal of the parts from the welding fixture. The toggle clamp according to this invention is movable into and out of remote locations to eliminate the need for extra clamp positioning devices.

It is therefore the primary feature of this invention to provide a clamp having movable jaws connected to an operating member by toggle links to permit movement of the clamping jaws into and out of a remote location. Another feature is that the clamping jaws are pivotally interconnected to impart a compound arcuate motion to one of the clamping jaws. Yet another feature is that the toggle links are moved overcenter in clamp closed position to lock the clamp against inadvertent opening. Still another feature is that a plurality of adjustable stops are provided to position the operating member and the clamping jaws in closed position. A further feature is that an overcenter spring is connected to the operating member to assist the opening and closing movement of the clamp.

Figure 1:
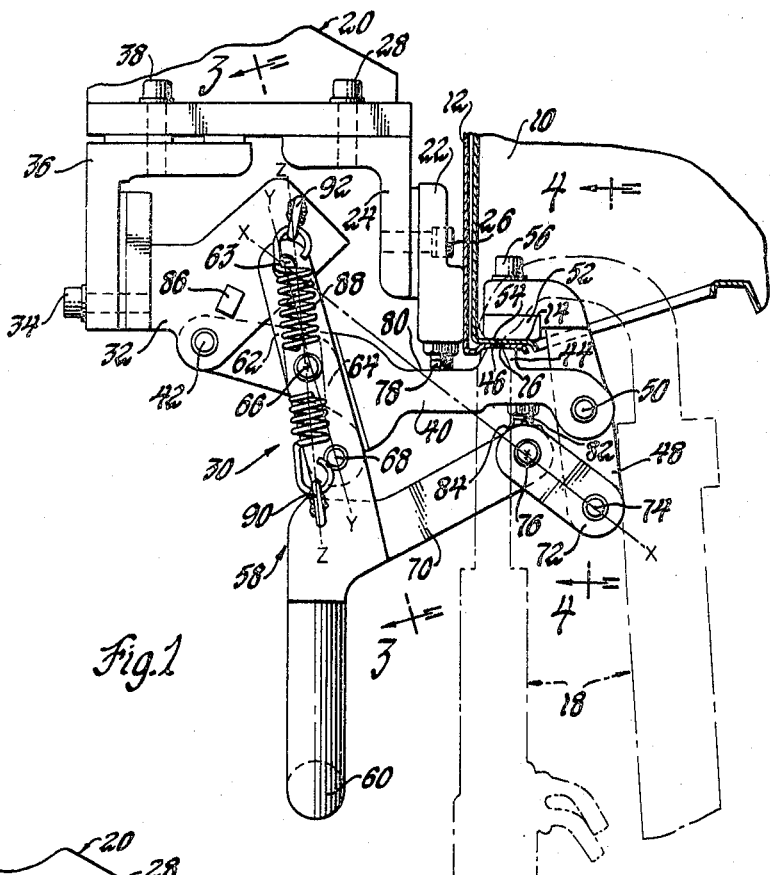
Figure 2:
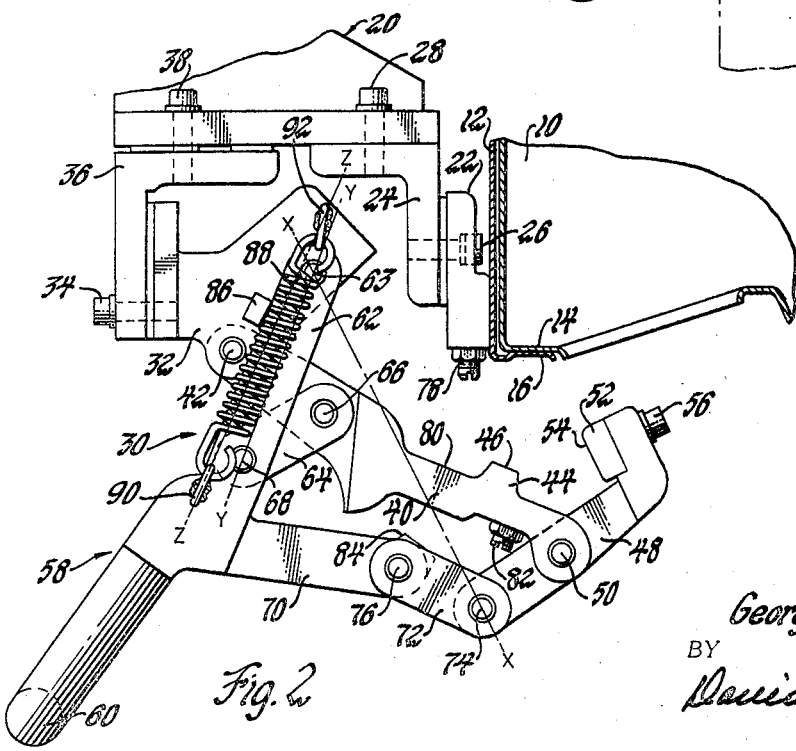
Figure 3:
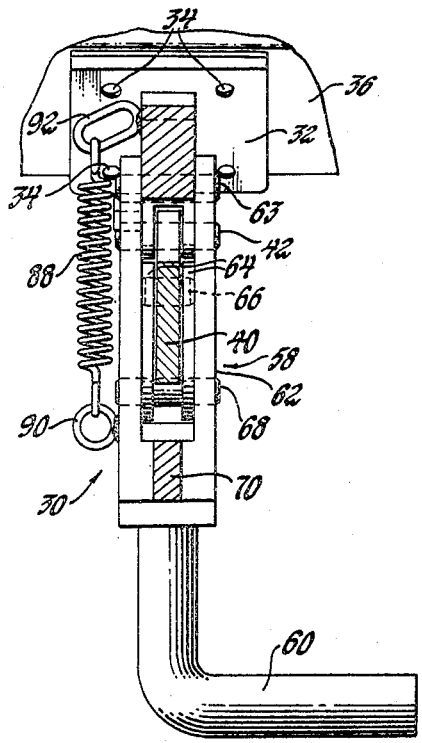
Figure 4:
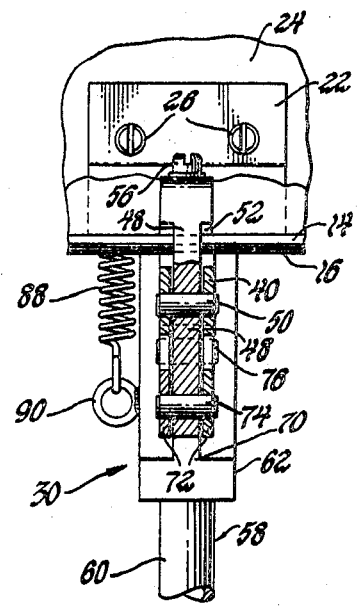
Figure 5:
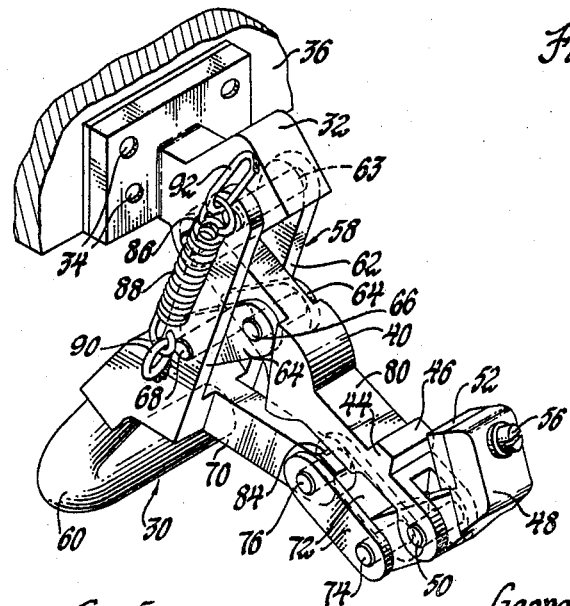

These and other features of this invention will become readily apparent upon reference to the following detailed description of the annexed drawings in which:

FIGURE 1 is an elevational view of a clamp according to this invention, with the clamp shown in closed position;
FIGURE 2 is a view similar to FIGURE 1, with the clamp shown in open position;
FIGURE 3 is an enlarged sectional view taken generally on the plane indicated by line 3—3 of FIGURE 1;
FIGURE 4 is an enlarged sectional view taken generally on the plane indicated by line 4—4 of FIGURE 1; and
FIGURE 5 is a perspective view of the clamp in open position.

Referring now to FIGURES 1 and 2 of the drawings, a pair of representative sheet metal parts 10 and 12 include respective apertured flanges 14 and 16 which are to be spot welded together by a plurality of conventional welding guns, such as the gun 18 schematically shown in phantom lines in FIGURE 1. The parts are loaded into a welding fixture 20 and are located with respect to each other by conventional locating members or blocks 22 which are mounted by a bracket 24 and bolts 26 and 28 on the fixture 20. After the parts are so located, one or more toggle clamps 30 according to this invention are moved from an open position, shown in FIGURE 2, to a closed position, shown in FIGURE 1, to clamp the flanges 14 and 16 to each other preparatory to their being welded. After the flanges are welded to each other, the clamps are again opened and the assembled parts 10 and 12 removed from the fixture.

The toggle clamp 30 includes a support member or base 32 which is bolted at 34 to an angle bracket 36 which is bolted at 38 to the fixture 20. The base 32 supports the operating elements of the clamp 30, which will now be described in detail with particular reference to FIGURES 2 and 5.

The clamp 30 includes a main or first clamping jaw 40 which is pivoted at 42 to the base 32 and includes an anvil 44 providing a clamping surface 46. At its distal end jaw 40 is bifurcated to receive a secondary jaw 48 which is pivoted thereto at 50. A detachable anvil 52 having a clamping surface 54 is bolted at 56 to jaw 48. As shown in FIGURE 1, panel flanges 14 and 16 are clamped together between the clamping surfaces 46 and 54.

Referring now to FIGURES 2 and 3, a clamp operating member 58 includes a lower angled handle portion 60 and a bifurcated upper portion 62 which embraces and is pivoted at 63 to base 32. Jaw 40 is operatively connected to operating member 58 by a pair of toggle links 64 which are pivoted at 66 to jaw 40 and at 68 to operating member 58. As best seen in FIGURES 2 and 4, operating member 58 includes an arm 70 which is operatively connected to the lower end of jaw 48 by a second pair of toggle links 72 which are pivoted at 74 to jaw 48 and at 76 to arm 70. Movement of operating member 58 will effect movement of both jaws 40 and 48, as will be later described in detail.

The clamp 30 is provided with adjustment features best shown in FIGURES 1, 2 and 5. To accurately locate jaw 40 in clamp closed position, an adjustable stop in the form of a set screw 78 is mounted on locating member 22 for engagement with an abutment or stop surface 80 on jaw 40. Similarly, a second adjustable stop in the form of a set screw 82 is mounted on the jaw 40 for engagement with an abutment or stop surface 84 located at the end of arm 70 to limit closing movement of operating member 58. This enables accurate positioning of jaw 48 in closed position. To limit the opening movement of operating member 58, an abutment or stop 86 may be provided on base 32.

A clamp locking feature, illustrated in FIGURES 1 and 2, is provided by toggle links 72 to lock the closed clamp against inadvertent opening. Pivots 63, 74 and 76 are so located that pivot 76 is moved past a line X—X extending through pivots 63 and 74 upon movement of clamp 30 to closed position. Any forces tending to pry jaws 48 and 40 apart will tend to pivot jaw 48 clockwise about pivot 50 and act through pivot 74, links 72, and pivot 76 on operating member 58. Since pivot 76 is overcenter, links 72 will tend to move operating member 58 further counterclockwise about pivot 63 and jam stop surface 84 more tightly against set screw 82 to prevent clamp opening.

A second locking feature, also illustrated in FIGURES 1 and 2, is provided by toggle links 64 to maintain clamp 30 in closed position and prevent inadvertent opening. Pivots 63, 66 and 68 are so located that pivot 66 is moved past a line Y—Y extending through pivots 63 and 68 upon movement of clamp 30 to closed position. The prying forces will tend to pivot jaw 40 clockwise about pivot 42 and act through pivot 66, links 64 and pivot 68 on operating member 58. Since pivot 66 is overcenter, links 64 will tend to move operating member 58 further counterclockwise about pivot 63 and again jam stop surface 84 against set screw 82 to prevent clamp opening. This overcenter condition of pivot 66 also precludes opening of clamp 30 by downward forces on the clamping jaw end of the clamp for the same reason.

To assist opening and closing movement of the clamp, an overcenter tension spring 88 is provided. As best shown in FIGURES 1 through 3, the lower end of spring 88 is hooked through an eye 90 welded to operating member 58. The upper end of spring 88 is hooked through an eye 92 welded to base 32 at a point spaced from pivot 63. In the extreme positions of the clamp shown in FIGURES 1 and 2, the line of force Z—Z of spring 88 lies on alternate sides of pivot pin 63, thus biasing the operating member 58 into each such position.

The operation of the clamp will now be described. The clamp is moved from the open position of FIGURE 2, in which jaws 40 and 48 are out of clamping proximity, to the closed position of FIGURE 1, in which the jaws are in clamping proximity by manually grasping handle 60 and swinging operating member 58 counterclockwise about pivot 63. This moves spring 88 overcenter to assist closing movement. During this movement, links 64 move jaw 40 counterclockwise about pivot 42 to move clamping surface 46 into engagement with the lower surface of panel flange 16. As jaw 40 moves upwardly, jaw 48 is carried along by pivotal connection 50 and is simultaneously moved counterclockwise thereabout by toggle links 72. Thus, anvil 52 is moved in a compound arcuate path through the panel apertures into engagement with the upper surface of flange 14. The flanges 14 and 16 are then securely clamped together between anvils 44 and 52 of clamping jaws 40 and 48.

After the panels 10 and 12 are securely clamped, welding guns 18 are positioned by means not shown and flanges 14 and 16 are welded. After welding, the clamp is opened by grasping handle 60 and swinging operating member 58 clockwise about pivot 63 against the force of spring 88. This breaks both overcenter toggles by moving pivot 76 past line X—X and moving pivot 66 past line Y—Y. Operating member 58 then acts through links 64 to swing jaw 40 clockwise about pivot 42 and acts through links 72 to swing jaw 48 clockwise about pivot 50 until spring 88 is overcenter to move and hold operating member 58 against stop 86, as shown in FIGURE 2. The welded parts 10 and 12 may then be removed from the welding fixture.

It will be noted that both clamp jaws 40 and 48 move into and out of remote clamping proximity with flanges 14 to 16 to facilitate welding and removal of the welded parts. This movement is achieved by the pivotal interconnection of jaws 40 and 48 and operating member 58, plus the spaced pivotal mounting of jaw 40 and operating member 58 on base 32, which enable elimination of any additional clamp positioning devices.

While only a preferred embodiment of this invention has been shown and described, modifications thereof are contemplated within the scope of the following claims.

I claim:
1. A toggle clamp, comprising:
   a base,
   a first jaw having a clamping surface and pivoted to the base,
   a second jaw having a clamping surface and pivoted to the first jaw for movement therewith and movement relative thereto,
   an operating member pivoted to the base,
   a first link pivotally connecting the first jaw to the operating member for moving the first jaw relative to the base between clamp open and clamp closed positions upon pivotal movement of the operating member, and
   a second link pivotally connecting the second jaw to the operating member, the second link being operable, upon pivotal movement of the operating member, to locate the second jaw in clamping proximity to the first jaw when in the clamp closed position and to locate the second jaw out of clamping proximity to the first jaw when in the clamp open position.

2. The clamp of claim 1, wherein pivotal movement of the operating member to move the jaws from clamp open to clamp closed positions effects overcenter movement of the first and second links, in which the first link first jaw pivot moves past a line extending through the operating member base pivot and the first link operating member pivot, and the second link operating member pivot moves past a line extending through the operating member base pivot and the second link second jaw pivot.

3. The clamp of claim 1, including biasing means interconnecting the operating member and base and operable to alternately bias the operating member into positions corresponding to clamp open and clamp closed positions of the jaws.

4. The clamp of claim 1, including:
   stop means mounted on the first jaw, and
   second adjustable stop means mounted on the base,
   the first and second stop means being mutually engageable upon movement of the jaws to clamp closed position to limit movement of the first jaw.

5. The clamp of claim 4, including:
   third stop means mounted on the operating member,
   fourth adjustable stop means mounted on the first jaw,
   the third and fourth stop means being mutually engageable upon movement of the jaws to clamp closed position to limit movement of the operating member.

6. The clamp of claim 5, including fifth stop means mounted on the base and engageable by the operating member in clamp open position of the jaws to limit movement of the operating member.

7. In combination with a welding fixture, a toggle clamp for clamping together metal panels to be welded, comprising:
   a base mounted on the fixture,
   a first jaw having a clamping surface intermediate its ends and pivoted at one end to the base,
   a second jaw having a clamping surface at one end and pivoted intermediate its ends to the other end of the first jaw for movement therewith and movement relative thereto,
   an operating member pivoted to the base,
   a first link pivoted to the first jaw at a point intermediate the clamping surface and the one end and pivoted to the operating member at a point spaced from the operating member base pivot, the first link moving the first jaw relative to the base between clamp open and clamp closed positions upon pivotal movement of the operating member,
   a second link pivoted to the second jaw at its other end and pivoted to the operating member at a point spaced from the other pivots, the second link being operable, upon pivotal movement of the operating member to locate the second jaw in clamping proximity to the first jaw when in the clamp closed position and to locate the second jaw out of clamping proximity to the first jaw when in the clamp open position, a tension spring interconnecting the operating member and the base at points spaced from the operating member base pivot for alternately biasing the operating member into positions corresponding to clamp open and clamp closed positions of the jaws, and stop means on the base, first jaw and operating member for limiting movement of the operating member and first and second jaws between clamp open and clamp closed positions.

References Cited

UNITED STATES PATENTS 2,835,291   5/1958   Blatt et al. _____ 269—228
2,929,422   3/1960   Tyler et al. _____ 269—228 X ROBERT C. RIORDON, Primary Examiner